(No Model.)

G. H. CHINNOCK.
PNEUMATIC TIRE.

No. 560,192. Patented May 19, 1896.

WITNESSES:
C. W. Benjamin
B. S. Winslow

INVENTOR
George H. Chinnock
BY
Livingston Emmy
ATTORNEY

UNITED STATES PATENT OFFICE.

GEORGE H. CHINNOCK, OF BROOKLYN, NEW YORK, ASSIGNOR, BY MENSE ASSIGNMENTS, TO THE SELF-HEALING PNEUMATIC TIRE COMPANY, OF NEW YORK.

PNEUMATIC TIRE.

SPECIFICATION forming part of Letters Patent No. 560,192, dated May 19, 1896.

Application filed November 20, 1895. Serial No. 569,536. (No model.)

*To all whom it may concern:*

Be it known that I, GEORGE H. CHINNOCK, a citizen of the United States, residing in Brooklyn, county of Kings, and State of New York, have invented a new and Improved Pneumatic Tire, of which the following is a specification, reference being had to the accompanying drawings, forming a part of the same.

To produce a practically "non-puncturable" pneumatic tire has been the acme of the art of the bicycle-manufacturers ever since the bicycle came so generally into public use; but owing to the necessities of the case—such as elasticity, lightness, durability, flexibility, and strength—such a tire has not been produced; but by this invention I shall describe a construction of tire that has proved practically non-puncturable—that is to say, a self-healing pneumatic tire.

Referring now to the drawings, Figure 1 represents a composite tire involving the principle of my invention; Fig. 2, a modification of the same, and Fig. 3 a simplified form.

For the purposes of practically applying the form and construction of this invention I have employed as a self-healing material pure rubber, which, as is well known, possesses the property of closing in or healing any puncture when the instrument of puncture is removed; but I do not wish to limit myself to pure rubber, as there are compounds that will fulfill the same function equally as well.

Referring more particularly to the drawings, *a* represents a "hose-pipe" or other tire; *b*, the rim of the wheel.

*c* represents the self-healing material.

In Fig. 1 I use a vulcanized-rubber tube provided with thickened or reinforced portions 1 and 2, that may be ribs, if desired, and which are preferably of hardened rubber. A portion 3 of the tire is preferably of some non-elastic material, such as canvas, suitably secured to the said thickened or reinforced portions. Between the thickened portions 1 and 2 is located a band of self-healing material, and to the same is attached a segmental band of vulcanized rubber, hardened gelatin, or other elastic material to complete the circular contour of the tire. To form a double-tube tire, I use an ordinary shoe or envelop of vulcanized rubber or canvas.

Figure 1:
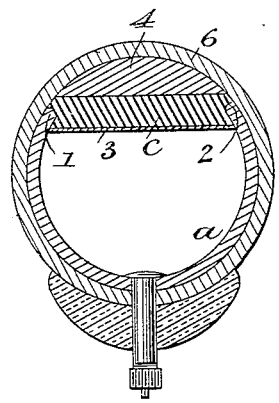
Figure 2:
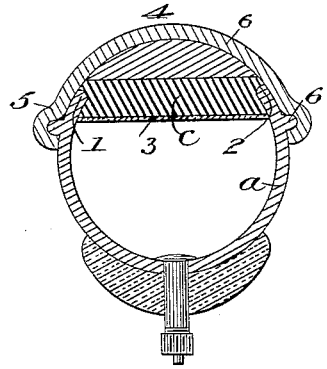
Fig. 2 is a modification of Fig. 1 in that the tube is provided with ribs 5 and 6, upon which an outer shoe or cover fits by means of suitable recesses provided therein and is held in position by the pressure of the compressed air within the tube.
Figure 3:
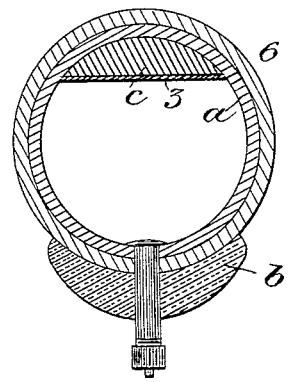
Fig. 3 is a modification of Figs. 1 and 2 in that the tube is provided with a segmental piece or band of self-healing material directly attached to the tube, and in case of "road-tires" a shoe or cover is added.

Having now described my invention, what I claim, and desire to secure by Letters Patent, is—

1. A pneumatic tire consisting of a tube of vulcanized rubber provided with a non-elastic portion, a band of self-healing compound and a suitable elastic tread.

2. In a pneumatic tire a vulcanized-rubber tube provided with suitable thickened or reinforced portions, a non-elastic portion located between said thickened portions, a band of self-healing material between said thickened portions and upon said non-elastic portion, and a suitable elastic tread completing the circular contour of the tire.

3. A pneumatic tire consisting of a tube provided with a non-elastic portion and a band of self-healing material.

4. In a pneumatic tire the combination of a tube provided with a non-elastic portion and a band of self-healing material, and also provided with suitable ribs or projections with an outer cover provided with suitable recesses to fit said ribs or projections and held in position by the pressure of the air within the tube.

GEORGE H. CHINNOCK.

Witnesses:
GEO. H. CHINNOCK, Jr.,
FRANK L. ZABRISKIE.